United States Patent [19]

Hecht

[11] 4,431,603
[45] Feb. 14, 1984

[54] SELF-ACTUATED DEVICE

[75] Inventor: Samuel L. Hecht, Richland, Wash.

[73] Assignee: The United States of America as represented by the United States Department of Energy, Washington, D.C.

[21] Appl. No.: 260,864

[22] Filed: May 6, 1981

[51] Int. Cl.³ .............................................. G21C 15/00
[52] U.S. Cl. .................................. 376/352; 376/327; 376/336; 60/527
[58] Field of Search ............... 376/336, 337, 175, 352, 376/450, 424, 413, 331, 329, 327; 251/11, 12, 61.4; 60/527, 530

[56] References Cited

U.S. PATENT DOCUMENTS

| | | | |
|---|---|---|---|
| 1,159,893 | 11/1915 | Browne et al. | 60/530 |
| 2,074,526 | 3/1937 | Williams | 251/11 |
| 2,769,312 | 11/1956 | Harrold et al. | 251/11 |
| 2,952,436 | 9/1960 | Fall et al. | |
| 2,987,455 | 6/1961 | Huston et al. | 376/336 |
| 3,036,965 | 5/1962 | Braun | 376/352 |
| 3,211,414 | 10/1965 | Webb | 251/11 |
| 3,251,746 | 5/1966 | Jeffries et al. | 376/331 |
| 3,291,698 | 12/1966 | Fortescue | 376/424 |
| 3,650,505 | 3/1972 | Drexel | 251/11 |
| 3,756,083 | 9/1973 | Tatsutomi et al. | 251/11 |
| 3,771,551 | 11/1973 | John | 251/11 |
| 3,813,286 | 5/1974 | Goldman et al. | 376/450 |
| 3,823,560 | 7/1974 | Hansen | 60/527 |
| 3,970,007 | 7/1976 | Klein | |
| 3,992,257 | 11/1976 | Erp et al. | 376/336 |
| 4,036,433 | 7/1977 | Wagner et al. | 251/11 |
| 4,106,985 | 8/1978 | Molley et al. | 376/413 |
| 4,323,220 | 4/1982 | Huelle | 251/11 |

FOREIGN PATENT DOCUMENTS

| | | | |
|---|---|---|---|
| 880489 | 10/1961 | United Kingdom | 376/352 |
| 1020668 | 2/1966 | United Kingdom | 376/352 |

OTHER PUBLICATIONS

Apex-492, 5/59, pp. 7, 16, 20, 71-74.
KAPL-M-IBV-7, 9/55, Vandenberg, pp. 3-5, 9-17, 24-26.

Primary Examiner—Harvey E. Behrend
Attorney, Agent, or Firm—K. R. Bowers; Z. L. Dermer

[57] ABSTRACT

A self-actuated device, of particular use as a valve or an orifice for nuclear reactor fuel and blanket assemblies, in which a gas produced by a neutron induced nuclear reaction gradually accumulates as a function of neutron fluence. The gas pressure increase occasioned by such accumulation of gas is used to actuate the device.

1 Claim, 1 Drawing Figure

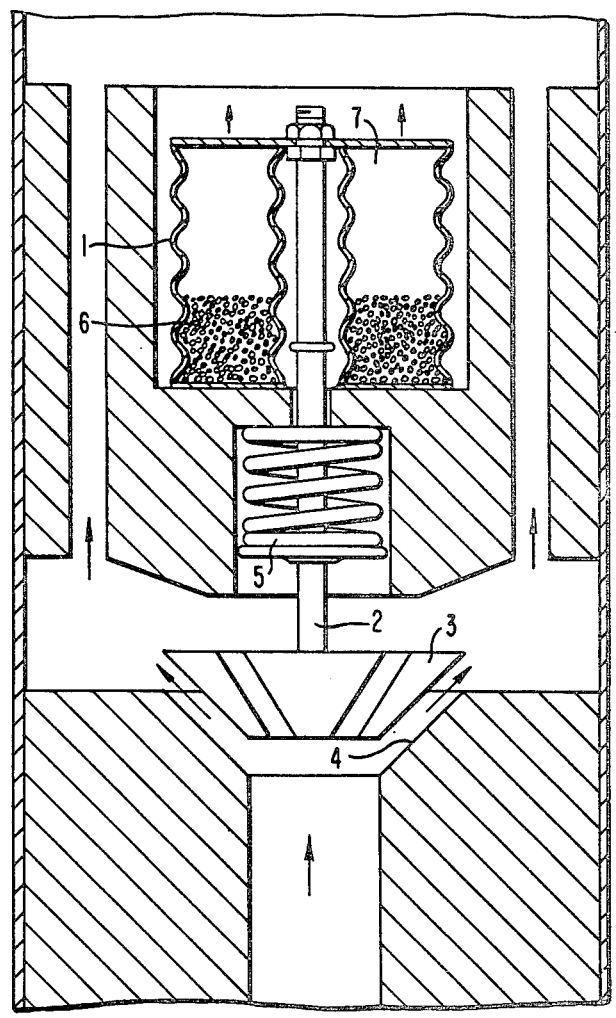

SELF-ACTUATED DEVICE

GOVERNMENT CONTRACT

This invention was conceived during performance of a contract with the U.S. Government designated EY-76-C-14-2170.

BACKGROUND OF THE INVENTION

This invention is a self-actuated, automatic device, especially a valve for control of fluid flow for application within a radiation field in a nuclear reactor.

Some applications exist in which it would be of benefit if a specific future operation of a valve could be planned in advance and designed as an inherent characteristic of the valve. The following is illustrative.

Fuel assemblies in nuclear reactors generally have nuclear and thermodynamic properties which change over the course of exposure to neutrons in the reactor. The content of fissile uranium 235 decreases in a fuel assembly during exposure to a neutron flux while the plutonium 239 content of a blanket assembly may increase. In the case of a fuel assembly, it may be desired to gradually decrease coolant flow through the assembly to match a gradual decrease in the assembly fission rate. In the case of the blanket assembly, it may be desired to gradually increase coolant flow through the blanket assembly to match a gradual increase in fission reactions.

Coolant flow through an individual fuel or blanket assembly can be controlled by inlet or outlet valves (or variable-size orifices) attached to the individual assemblies in the reactor. A problem lies in access to the vlave in the nuclear reactor. Fuel and blanket assemblies in a reactor are numerous such that any system for control of many valves from outside of the reactor would be extremely complex. Several schemes have been attempted to provide assemblies with variable-size orifices, but as yet no economically viable or practical system for true variability in orifice size has been discovered.

Consequently, it is desired to provide an automatic, self-actuated valve, which is of particular use as an orificing valve for use with nuclear fuel and blanket assemblies.

SUMMARY OF THE INVENTION

The self-actuating valve of this invention has an actuating shaft connected to an expandable bellows. The bellows is so arranged that expansion of the bellows moves the valve shaft thus opening or closing the valve as appropriate to the application.

The bellows has a "reaction material" located inside. A "reaction material" is defined herein as a material containing elemental nuclei which absorb nuclear radiation, enter into a nuclear reaction or transformation, and emit as a byproduct new nuclei which are or become a species of gas. Compounds of boron are likely reaction materials, since boron reacts with neutrons to emit helium. Lithium and beryllium are also likely candidates.

As the neutron flux at the valve site exposes the reaction material, byproduct gas pressure builds up which expands the bellows. The generation of a pressure of several thousand pounds per square inch in the bellows is considered feasible.

The identity and mass content of this reaction material can be planned to generate sufficient gas to properly open or close the valve as desired.

This valve can open or close according to a preplanned scheme developed prior to closure and operation of the reactor, varying the orifice size to an assembly without operator access or control.

BRIEF DESCRIPTION OF THE DRAWINGS

A single FIGURE is a schematic section of one embodiment of the valve.

DETAILED DESCRIPTION

The automatic, self-actuated device of this invention in a first embodiment is a valve which can be planned and designed to actuate as a function of the radiation "fluence"; defined as the time integrated, accumulated exposure to radiation. Operation of the valve may be continuous and linear with the fluence, or may be triggered to actuate at a certain fluence value.

Refer to the single FIGURE. This schematic illustrates an application in which expansion of a bellows 1 causes valve shaft 2 to lift the valve plug 3 off seat 4, overcoming spring 5 force and opening the valve to permit flow therethrough. The entire valve may be located at the inlet to a blanket assembly (not shown). A reaction material 6 is located within the bellows, in this case in the form of a powder. The reaction material 6 may be boron carbide or other material which absorbs nuclear radiation and emits a gas. Boron carbide absorbs neutron irradiation and emits helium gas. As the powder 6 absorbs neutrons and emits helium gas, this gas accumulates in and pressurizes volume 7, expanding the bellows 1, and opening the valve.

Prior to installation of the valve, a plan is developed which describes the future valve operation. Suppose that it is desired that the valve remain closed until a neutron fluence equivalent to 8,000 MWD/ton as measured in the reactor fuel has been observed by the valve, and open continuous thereafter, being fully open at 12,000 MWD/ton. Sufficient boron carbide powder is added to the bellows such that the spring 5 tension is just equaled by gas pressure at 8,000 MWD/ton, and the bellows is fully expanded at 12,000 MWD/ton. Besides planning the initial powder loading, the spring tension, initial pressure, and bellows expansion range may be adjusted.

The pressure in the bellows will also vary with ambient temperature of the fluid. Buildup of pressure in the bellows due to neutron reactions can greatly exceed pressure variations due to expected temperature changes in many applications such that the temperature effect does not prevent proper valve operation. In some cases, a temperature change can be planned to favorably affect the valve: a valve which is currently 30% open will be opened somewhat more, admitting more coolant flow, during an incident involving higher fluid temperatures due to resulting higher gas temperature and gas pressure in the bellows 1.

Several variations of the concept may be mentioned. The valve may have slots or holes in the valve seat 4 or plug 3 such that no absolute shutoff of flow is possible. The device itself may be disposed to be a trigger to the actuation of another device or valve. For example, the shaft 2 could be a locking device for a spring-loaded shaft for a valve, which valve is released to open or close on triggered release of the shaft by movement of the gas-impelled bellows. Additionally, shaft 2 may ave ratchets which prevent movement of shaft 2 to return to a closed valve position in the event of a leak or rupture of bellows 1.

The reaction material may be in several physical forms: powder, pellet, or even liquid.

It is to be noted that the neutron fluence used to actuate the valve is precisely the parameter which varies the nuclear mass inventory of fuel and blanket assemblies, which inventory determines the desirable coolant flow rate. The valve is aptly suited therefore for use as a reactor assembly orifice.

Several modifications of the device are possible without departing from the true spirit and scope of the invention. Therefore, the specification and drawing should be interpreted as illustrative rather than limiting.

I claim:

1. In a nuclear reactor having a nuclear fuel assembly therein with coolant flowing therethrough, said coolant flow passing through an orifice, the improvement comprising neutron fluence responsive, self-actuated flow control valve for the orificing of coolant flow through said nuclear fuel assembly which valve comprises:
   (a) a shaft;
   (b) plug means for controlling the coolant flow through said orifice, said plug means connected to said shaft for actuation thereby;
   (c) spring means for biasing said plug means to a predetermined position;
   (d) a gas-tight bellows connected to said shaft such that expansion of said bellows moves said shaft thereby actuating said plug means;
   (e) a mass containing a material chosen from the group boron, lithium, or beryllium, said mass located within said bellows such that gas released by a nuclear reaction of said material with neutrons accumulates in said bellows, said mass chosen in quantity so as to match the actuation of said valve with a chosen neutron fluence.

* * * * *